July 17, 1934.  C. H. WILLIS  1,966,940
METHOD OF STARTING SYNCHRONOUS MACHINES
Filed March 12, 1932
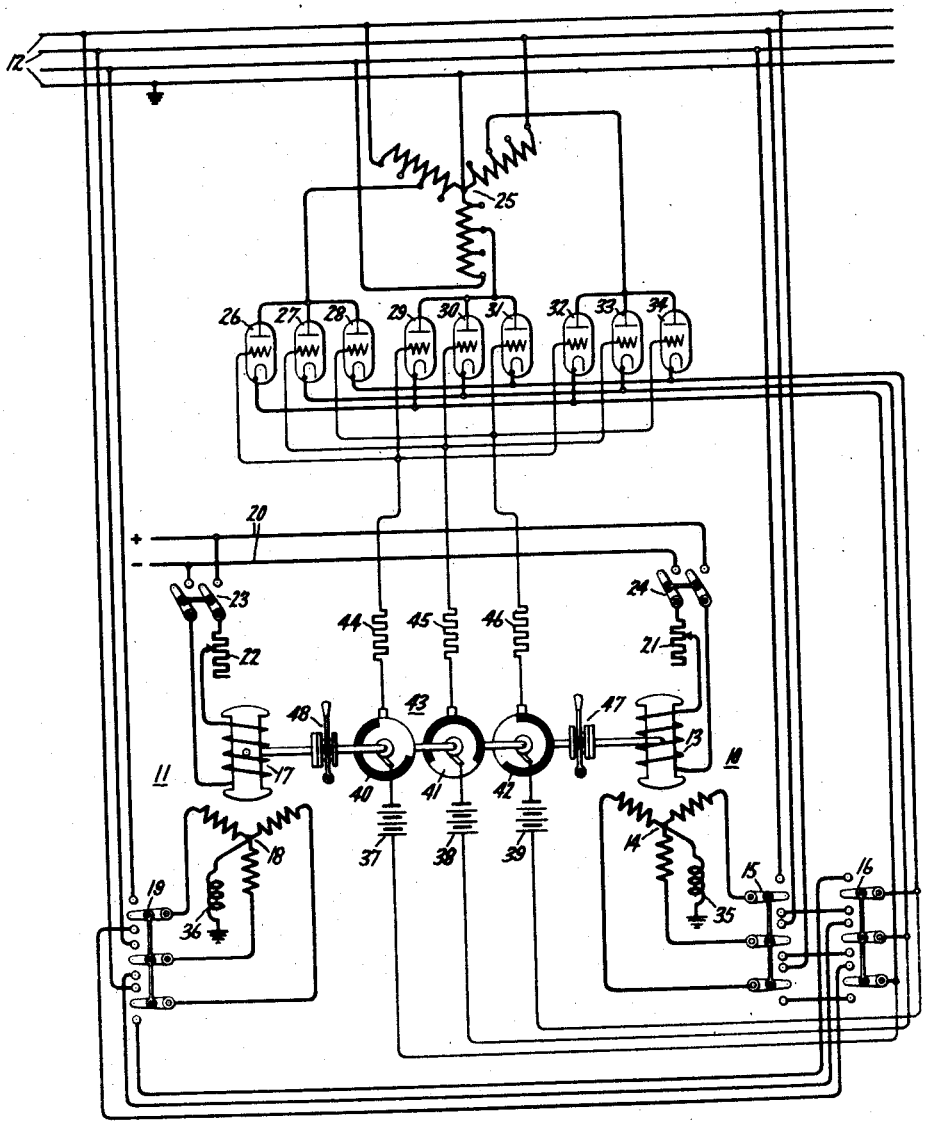
Inventor:
Clodius H. Willis,
by *Charles A. Tuller*
His Attorney.

Patented July 17, 1934

1,966,940

UNITED STATES PATENT OFFICE 1,966,940

METHOD OF STARTING SYNCHRONOUS MACHINES

Clodius H. Willis, Princeton, N. J., assignor to General Electric Company, a corporation of New York Application March 12, 1932, Serial No. 598,520

2 Claims. (Cl. 172—274)

My invention relates to methods of starting synchronous dynamo-electric machines and more particularly to a method for starting such machines from a source of alternating current at substantially unity power factor.

It is customary to provide synchronous dynamo-electric machines which must be started from an alternating current circuit with amortisseur windings and to start them as induction motors, exciting the field windings when they approach synchronous speed. When starting a synchronous machine by this method it is well known that large currents of low power factor lagging are drawn from the alternating current circuit, even when a compensator is provided for reducing the applied voltage under starting conditions. Such low power factor currents are undesirable from the standpoint of stability and voltage regulation of the system, particularly in the case, for example, of an automatic synchronous condenser substation in which a synchronous condenser is started up in response to predetermined power factor conditions to supply the required leading wattless current to the system. In this latter case the starting of the synchronous condenser draws a large lagging current from the line and temporarily aggravates the condition which it is designed to remedy.

It is an object of my invention, therefore, to provide an improved method of starting a synchronous dynamo-electric machine from a source of alternating current which will overcome the above mentioned disadvantages of the arrangements of the prior art, and which will be simple and reliable in operation.

It is another object of my invention to provide an improved method of starting a synchronous dynamo-electric machine from a source of alternating current at substantially unity power factor.

In accordance with my invention, alternating current derived from the supply circuit is converted by means of an electric valve frequency changer of any of the several types well known in the art to a very low frequency, preferably approaching zero frequency, and a synchronous dynamo-electric machine is energized from this reduced frequency. It is also desirable, usually, to reduce the voltage by means of a tap changing transformer or its equivalent. The frequency of the energy produced by the valve converting apparatus is controlled by means of a commutator driven directly from the machine, so that as the machine comes up to speed, the frequency is automatically and correspondingly increased. As the machine approaches synchronous speed the motor connections are changed from the valve frequency changer to the alternating current circuit. It has been found that with such an arrangement a synchronous machine may be started from a source of alternating current at substantially unity power factor.

For a better understanding of my invention together with other and further objects thereof, reference is had to the following description taken in connection with the accompanying drawing and its scope will be pointed out in the appended claims. The single figure of the accompanying drawing illustrates an arrangement embodying my invention for selectively starting a pair of three-phase synchronous dynamo-electric machines from a source of three-phase alternating current.

Referring now more particularly to the drawing, there is illustrated an arrangement for selectively starting and operating a pair of synchronous motors 10 and 11 from a three-phase alternating current circuit 12. The synchronous motor 10 comprises a field winding 13 and a three-phase armature winding 14, which is adapted to be energized directly from the alternating current circuit 12 through a two position switch 15 when in its upper position and from the frequency changer to be described hereinafter through switches 15 and 16, each in its lower position. Similarly, the machine 11 comprises a field winding 17 and a three-phase armature winding 18 adapted to be energized directly from the alternating current circuit 12 or the frequency changer arrangement through a two position switch 19. The field windings 13 and 17 are arranged to be energized from a direct current circuit 20 through variable resistors 21 and 22 and switches 24 and 23, respectively. The arrangement for starting the synchronous machines 10 and 11 include any well known means for reducing the applied voltage, such for example, as a three-phase tap changing autotransformer 25, and a plurality of electric valves 26—34, inclusive, which cooperate with the autotransformer 25 to form an electric valve frequency changing apparatus. As illustrated, each of the several phases of the armature windings 14 or 18 are connected through the switch 16 to each of the supply phases of the autotransformer through one of the groups of valves 26—29—32, 27—30—33, or 28—31—34. The alternating current circuit 12 is illustrated as a four wire grounded neutral system in which the ground is connected to the neutral point of the autotransformer 25 and the neutral points of the armature windings 14 and 18 through the reactors 35 and 36, respectively, which are provided to substantially reduce the supply frequency ripples in the low frequency alternating current supplied to the machines 10 or 11 under starting conditions.

Each of the several electric valves 26–34, inclusive, is provided with an anode, a cathode and a control grid, and may be of any of the several types well known in the art, although I prefer to use valves of the vapor electric discharge type. The groups of valves 26—29—32, 27—30—33, and 28—31—34 are adapted to be energized successively and periodically from the positive bias batteries 37, 38 and 39, through the sections 40, 41 and 42 of a distributor 43 and current limiting resistors 44, 45 and 46, respectively. The distributor 43 is adapted to be driven directly from the rotors of the machines 10 or 11 through the clutch members 47 and 48, respectively, which should be effective to connect the distributor to its respective rotors in only one predetermined mechanical position, in order that the conductive segments of the distributor section may have the correct mechanical phase relation with respect to the armature winding to render conductive the proper group of electric valves.

In explaining the operation of the above described apparatus, it will be assumed that the rotors of the machines 10 and 11 are in the positions illustrated and that it is desired to start the machine 10. The connections to the autotransformer 25 are made to the taps of lowest voltage, the switches 15 and 16 are both operated to their lower positions as illustrated in the figure, and the clutch 47 is operated to connect the distributor 43 to the motor of the machine 10. Under these conditions, the grids of the electric valves 26—29—32 will be energized from the battery 37 through the distributor section 40, and these three valves, together with the autotransformer 25 operate to supply rectified unidirectional current of low voltage to the left-hand phase winding of the armature 14. The rotor of the machine 10 is in such a position as to receive a torque from the energized armature phase winding and begins to rotate. After the machine has turned through 120 degrees, the grids of the valves 26—29—32 are deenergized and the grids of the valves 27—30—33 become excited through the distributor section 41, so that these valves operate in a similar manner to excite the lowermost phase winding of the armature 14. Similarly, the valves 28—31—34 operate 120 degrees later to excite the right-hand phase winding of the armature 14. In this manner, each of the several groups of valves operate to supply unidirectional current successively to the several phase windings of the armature 14 and to produce rotation of its rotor. It will be noted that the group of valves which is rendered conductive by means of the distributor 43 is dependent upon the mechanical position of the rotor and that that group of valves is rendered conductive which will excite the proper phase winding to produce a torque on the motor rotor. As the speed of the motor increases, the field winding 13 is energized through the switch 24 and induces a counter-electromotive force in the several phase windings of the armature 14 so that the applied voltage from the autotransformer may be increased by changing the connections to the taps of next higher voltage. In this manner the machine 10 may be brought up to speed, the autotransformer 25, the several electric valves and the distributor arrangement 43 cooperating to act as a frequency changer supplying variable frequency intermittent current to the several phases of the winding 14. When the motor 10 has reached approximately synchronous speed the switch 15 is operated from its lower to its upper position thus connecting the motor directly to the alternating current circuit 12. During any particular interval when one of the phase windings of the winding 14 is energized, it will be noted that the autotransformer 25, together with the active valves, comprises a rectifier which draws substantially unity power factor current from the circuit 12. Hence, unity power factor current is drawn from the circuit 12 during the entire starting operation of the motor, only sufficient current being supplied to produce the necessary starting power. It will be obvious that, in case it is desired to start up the machine 11, similar steps in the operation will be followed, with switch 19 substituted for the switch 15, and the switch 16 operated to its upper position. In this manner a single autotransformer, together with its associated groups of valves, may be operated to start any of a number of synchronous dynamo-electric machines.

While I have illustrated my invention as applied to an arrangement for starting up a pair of three-phase synchronous dynamo-electric machines, it will be apparent to those skilled in the art that it is equally applicable to starting an operation of synchronous machines of any number of phases and that the same starting arrangement may be utilized to start any number of machines.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:—

1. The method of starting a synchronous dynamoelectric machine from a source of alternating current which comprises rectifying said alternating current at substantially unity power factor and at a lower voltage, periodically transferring the rectified current between the windings of said machine at a frequency lower than that of said source, increasing the frequency at which said current is transferred between the windings of said machine in accordance with the speed of said machine and simultaneously increasing the voltage thereof, and energizing said machine directly from said source when it approaches synchronous speed.

2. An electric translating system comprising a source of alternating current, a plurality of synchronous machines, a single electric valve frequency changer including a single distributor mechanism, means for selectively connecting said distributor to be driven by one of said synchronous machines to start it through said frequency changer, and switching means in circuit with each of said machines for connecting it directly to said source.

CLODIUS H. WILLIS.